United States Patent
Ferrera et al.

[19]

[11] Patent Number: 6,105,561
[45] Date of Patent: Aug. 22, 2000

[54] FUEL FEEDING SYSTEM AND METHOD FOR AN INTERNAL COMBUSTION ENGINE ABLE TO BE OPERATED SELECTIVELY WITH GASOLINE OR GAS

[75] Inventors: Massimo Ferrera; Riccardo Gozzelino; Aldo Perotto, all of Orbassano, Italy

[73] Assignee: C.R.F. Società Consortile per Azioni, Turin, Italy

[21] Appl. No.: 09/209,005

[22] Filed: Dec. 11, 1998

[30] Foreign Application Priority Data

Dec. 12, 1997 [IT] Italy ................................. TO97A1083

[51] Int. Cl.[7] ...................................................... F02B 39/00
[52] U.S. Cl. ........................... 123/575; 123/575; 123/576; 123/276 E; 123/179.8
[58] Field of Search ..................................... 123/525, 575, 123/576, 179.14, 276 E, 1 A, 179.7, 179.8

[56] References Cited

U.S. PATENT DOCUMENTS

| 3,783,841 | 1/1974 | Hirschler, Jr. et al. | 123/576 |
| 3,788,283 | 1/1974 | Perry | 123/575 |
| 5,549,083 | 8/1996 | Feuling | 123/576 |
| 5,555,873 | 9/1996 | Nolen | 123/575 |
| 5,592,924 | 1/1997 | Audisio et al. | 123/525 |

*Primary Examiner*—Tony M. Argenbright
*Assistant Examiner*—Brian J. Hairston
*Attorney, Agent, or Firm*—Sughrue, Mion, Zinn, Macpeak & Seas, PLLC

[57] ABSTRACT

In a fuel feeding system for an internal combustion engine adapted to selectively operate with gasoline or with a gas, such as LPG or methane, the engine is compelled to restart automatically in the gasoline mode after a stop during which the gas reservoir has been filled.

4 Claims, 2 Drawing Sheets

FUEL FEEDING SYSTEM AND METHOD FOR AN INTERNAL COMBUSTION ENGINE ABLE TO BE OPERATED SELECTIVELY WITH GASOLINE OR GAS

SUMMARY OF THE INVENTION

The present invention relates to fuel feeding systems for internal combustion engines able to be operated selectively with gasoline or gas, such as LPG or methane, of the type comprising:

gasoline feeding means, including a plurality of injectors associated with the engine cylinders, electronic control means controlling the gasoline injectors, adapted to receiving signals indicative of various parameters of the engine operation as well as to controlling the gasoline injectors accordingly, and gas feeding means, including:
  a plurality of gas injectors associated with the various engine cylinders,
  a gas feeding rail or manifold for feeding said injectors,
  a gas reservoir,
  conduit means for feeding gas from the reservoir to said rail,
  means for sensing the gas level within the reservoir, said electronic control means being adapted to controlling the switching between a gasoline mode of operation and a gas mode of operation and being further adapted to controlling also said gas injectors in the gas mode of operation, said electronic control means being further provided such as to compel the engine to be restarted in the gasoline mode of operation after a stop.

In the so-called "bi-fuel" type feeding systems, i.e. systems which are able to operate selectively either with gasoline or gas (LPG or methane), it is necessary that the system is operated with gasoline from time to time, in order to keep it efficient, even if the user generally prefers to operate the engine in the gas mode. Just in order to compel the user to operate the system with gasoline from time to time, there are known bi-fuel feeding systems in which, as indicated above, the electronic control means are provided in order to operate the engine with gasoline throughout a limited period of time after any start subsequent to a stop. However, this way of operation, whilst on one hand ensures the operation of the system with gasoline feed, on the other hand causes an excessive frequence of the gasoline operating mode and furthermore does not enable the advantages to be exploited deriving from starting the engine directly with gas.

The object of the present invention is that of overcoming this drawback.

In view of achieving this object, the invention provides a fuel feeding system of the type indicated at the beginning of the present description, characterized in that the above mentioned electronic control means are provided so as to compel the engine to be restarted, after a stop, in the gasoline mode of operation only if said means for sensing the gas level detect a raise of the gas level in the reservoir during the stop by a value greater than a predetermined threshold value.

Thus, due to the above mentioned feature, it is obtained that restart in the gasoline mode is caused automatically not after any engine stop, as in the above described known systems, but rather only after a stop for filling the gas reservoir. In other words, the system according to the invention still fulfils the object to compel the engine to operate with gasoline from time to time, so as to keep the gasoline feeding system efficient, but at the same time this result is obtained without exceeding in the frequence of the gasoline operating mode and exploiting the advantages of the gas operation in most of the engine starts.

According to a further feature, the electronic control means are further provided to automatically cause a shifting to the gasoline mode when the gas level in the gas reservoir decreases below a predetermined threshold value.

Naturally, the invention also provides a method for controlling fuel feeding to an internal combustion engine which is carried out by means of the above described system.

BRIEF DESCRIPTION OF THE DRAWINGS

Further features and advantages of the invention will become apparent from the description which follows with reference to the annexed drawings, given purely by way of non limiting example, in which.

DETAILED DESCRIPTION OF THE INVENTION

Figure 1:
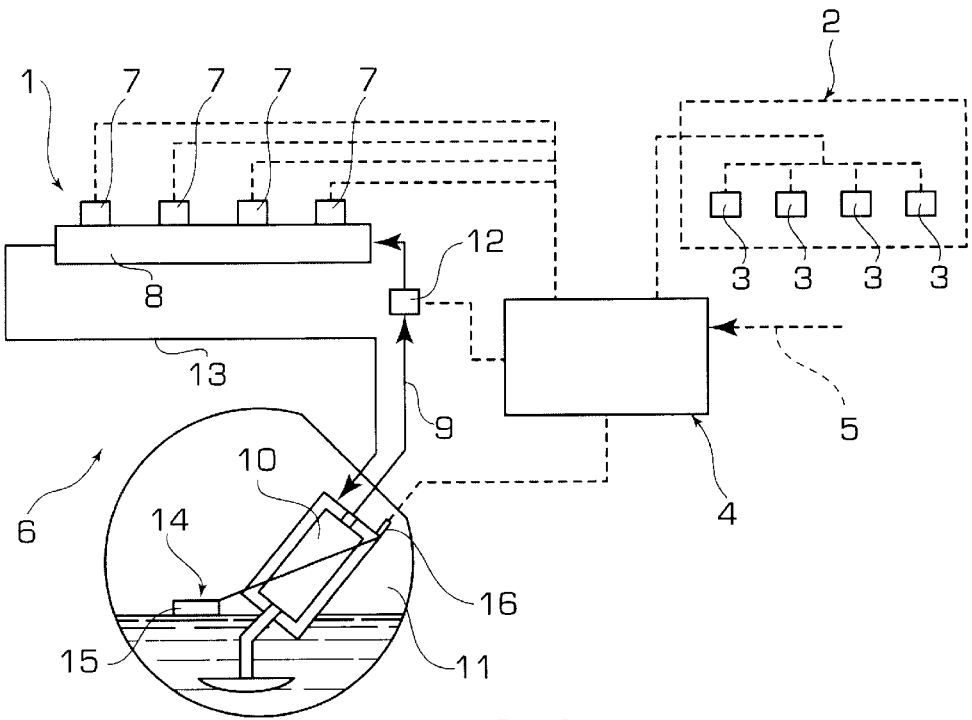
FIG. 1 is a diagram which shows a first example of application of the fuel feeding system according to the invention, to an engine able to operate with gasoline and LPG.

In FIG. 1, reference numeral 1 generally designates a fuel feeding system for an internal combustion engine of a motor-vehicle, adapted to operate selectively with gasoline and LPG. System 1 includes a sub-system 2 for feeding the gasoline to the engine, including a plurality of gasoline injectors 3 associated with the various cylinders of the engine and controlled by an electronic control unit 4 on the basis of signals 5 sent to the unit 4 and indicative of various engine operating parameters. The sub-system 2 can be made as a conventional electronically controlled fuel injection system, and therefore it is not described in detail in the present description and in the annexed drawings.

The fuel feeding system 1 according to the invention further includes a sub-system 6 for feeding LPG to the engine. Systems of this type have been known and used and have also formed the subject of previous patents of the same Applicant (such as European patent EP-B-0 725 208, and the corresponding U.S. Pat. No. 5,592,924). Sub-system 6 comprises a plurality of LPG injectors 7 which are associated with the various engine cylinders and are communicated to a feeding manifold or "rail" 8. Rail 8 is connected by means of a conduit 9 to the outlet of a pump 10, arranged within a LPG reservoir 11. Within conduit 9 there is inserted a pressure sensor 12. The LPG fed in excess to the injectors 7 returns to the reservoir 11 through a return conduit 13 which communicates with reservoir 11 by means of a one-way valve (not shown in the drawing) which prevents a LPG flow through conduit 13 towards rail 8. Within reservoir 11 there is arranged a level sensor 14, comprising a float 15 and a transducer 16. The sensor 12 and the transducer 16 send signals indicative of the pressure within conduit 9 and the LPG level within reservoir 11 to the electronic control unit 4.

The electronic unit 4 is provided for controlling also switching between the gasoline mode of operation and the LPG mode of operation. During the LPG mode of operation, the electronic control unit 4 also attends to controlling the LPG injectors 7 on the basis of the signal received from sensor 12 which detects pressure of LPG (which is function of the temperature), so as to enable the opening time of injectors 7 to be controlled accordingly.

Figure 2:
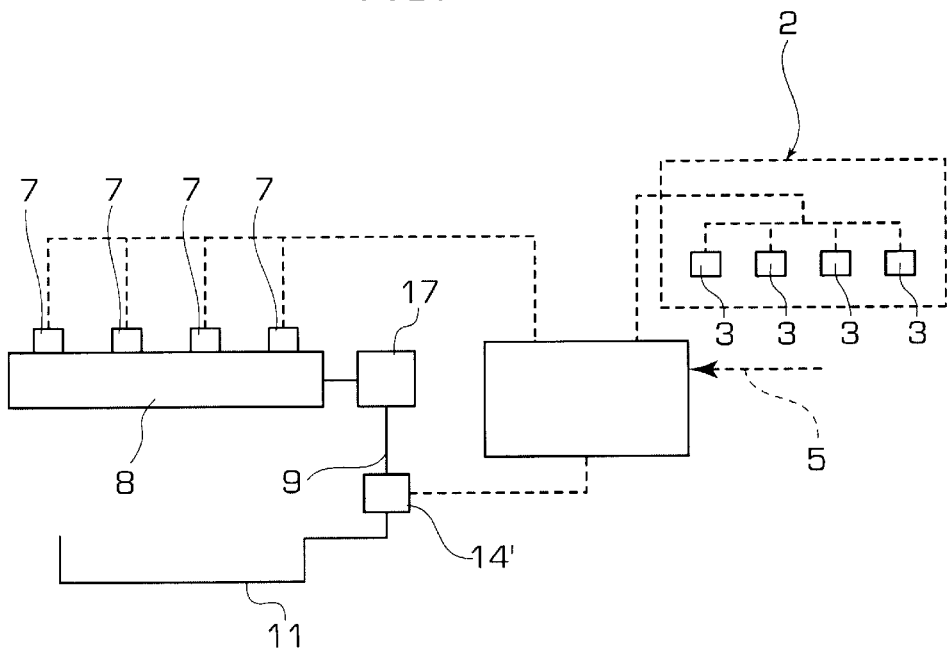
FIG. 2 shows a second example of application of the system according to the invention to an engine able to operate with gasoline or methane.

FIG. 2 shows the variant in case the system is adapted to operate with gasoline or methane. In this case, the reservoir 11 is constituted by a cylinder in which the methane is stored at a high pressure (in the order of 200 bars), while in the feeding conduit 9 there is interposed a pressure reducing device 17 which serves for decreasing the pressure of methane down to the value requested for proper operation of injectors 7. Also in this case a sensor 14' is provided, which is a pressure sensor, whose function is similar to that of the level sensor 14 of the system of FIG. 1.

The diagrams shown in FIGS. 1, 2 refer to two possible applications of the system and the method according to the invention.

Figure 3:
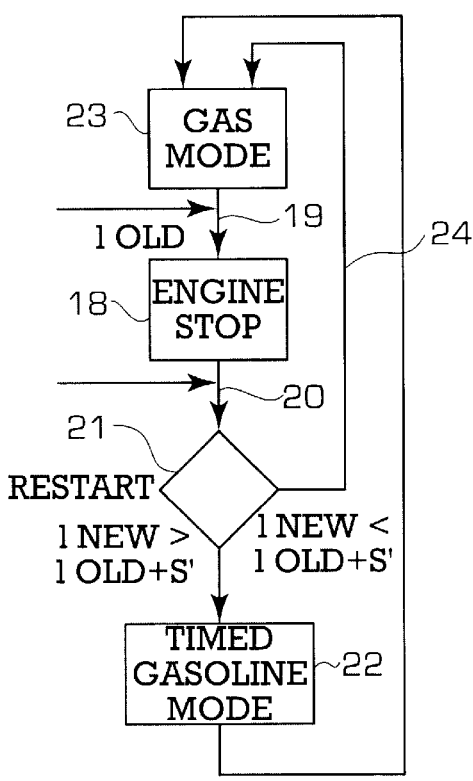
FIG. 3 is a block diagram which shows the method according to the invention in a first embodiment.

With reference to FIG. 3, which relates to a first embodiment of the invention, the electronic control unit 4, both in the case of FIG. 1, and in the case of FIG. 2, is provided so as to compel the system to operate in the gasoline mode throughout some period of time when the engine is started after a stop, in case meanwhile the reservoir 11 has been filled. In particular, with reference to FIG. 3, the electronic unit 4 acquires the gas level signals "$l_{OLD}$" and "$l_{NEW}$" before and after (see items 19, 20) a stop 18 of the engine. When the engine is restarted (see block 21) the unit checks that the difference between the $l_{NEW}$ level detected at 20 and the $l_{OLD}$ detected at 19 is greater than a predetermined threshold value "s'". If it is so (which indicates that the reservoir has been filled) the system is compelled to operate in the gasoline mode for some time (see block 22). Upon completion of this predetermined time interval the system returns automatically into the gas operation mode (see block 23) and remains in this mode until the engine has a new stop 18. However, if the comparison made at 21 does not show that the reservoir has been filled during the stop, when the engine is restarted it is operated immediately in the gas mode (see line 24).

By means of this control method, the system is compelled to operate with gasoline from time to time (precisely when the engine is restarted after any refilling of the gas reservoir), but not so frequently as it happens in the known systems where it is compelled to operate with gasoline systematically upon any engine restart. In this manner, a very good compromise is achieved between the need of keeping the gasoline feeding system efficient and that of exploiting the advantages deriving from the gas operation as much as possible, even in the engine starting stages.

Figure 4:
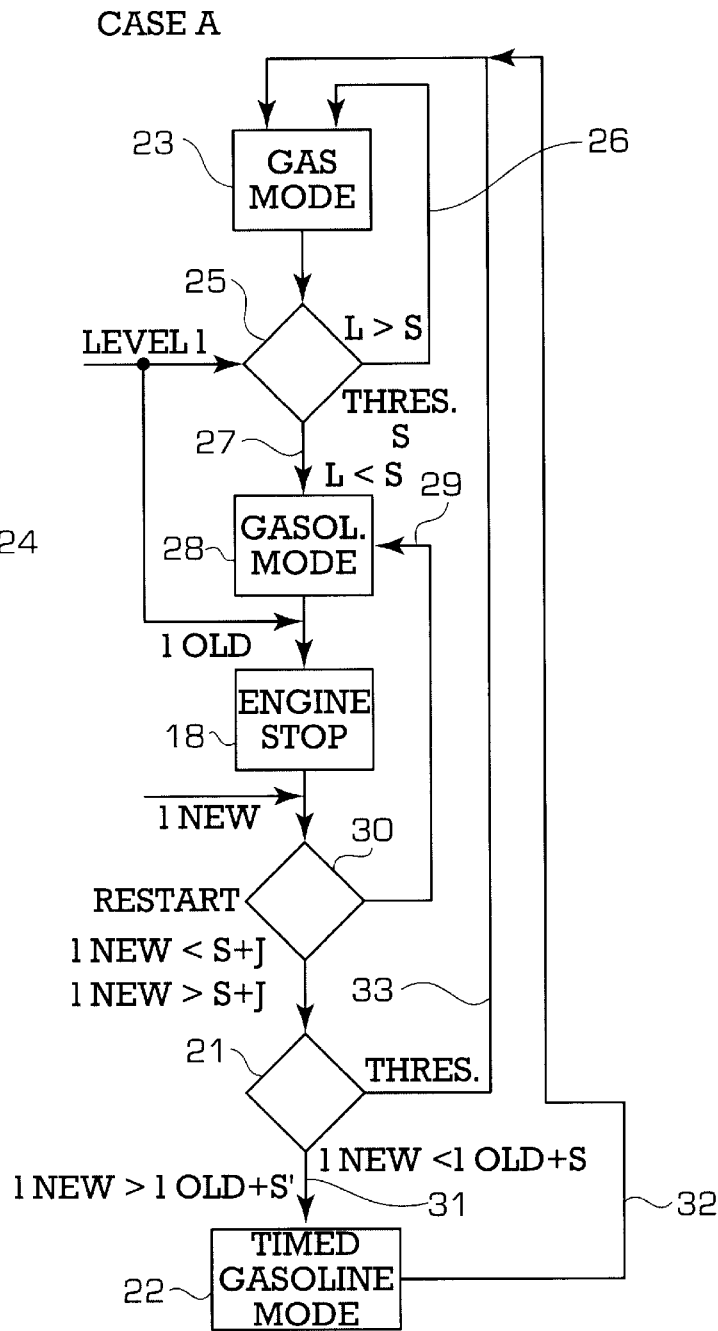
FIG. 4 is a block diagram which shows the method according to the invention in a second embodiment.

FIG. 4 relates to a further embodiment in which, further to providing a control method as described with reference to FIG. 3, the unit 4 also attends to switching automatically from the gas operation mode to the gasoline operation mode if the level sensor 14 detects a decrease of the gas level in the reservoir below a minimum admissible value. This solution is particularly useful in case of the application shown in FIG. 1, since it avoids that the fluid level in reservoir 11 lowers below a minimum value for proper operation of pump 10.

In the mode shown in FIG. 4, during operation of the system in the gas mode (block 23) a check is carried out (block 25) to see that the level in the reservoir is not lower than a minimum admissible value "s". If the level is above this value (line 26) the system keeps on operating with gas. However if the level is lower (line 27) the system is switched automatically into the gasoline mode (block 28). In case of engine stop (block 18), the signal of the gas level in the reservoir before ($l_{OLD}$) and after ($l_{NEW}$) the stop is acquired. When the engine is restarted (block 21) first of all a check is carried out to see whether the new level is lower than a minimum admissible value (corresponding to the "s" value with the addition of an istheresis I value). If the level is lower, the system is restarted in the gasoline mode (line 29). If the level is greater, the check of block 21 is carried out as already seen in the case of FIG. 3. If it comes out that during the stop the gas reservoir has been filled (line 31) the system is operated in the gasoline mode for a predetermined time interval, whereupon it returns to the gas mode (line 32, block 23). If instead no filling of the gas reservoir has been carried out during the stop (line 33) the system is restarted in the gas mode.

In the case in which, although starting should be carried out with gasoline, the engine does not start, for instance because of lack of gasoline, the system automatically switches to the starting in the gas mode and stores the information of "failed starting with gasoline" in a memory to be used at the subsequent starting.

From the foregoing description it clearly appears that the system and the controlling method according to the invention exploit the advantages of the starting in the gas mode while ensuring that the gasoline feeding system is kept efficient by activating from time to time the gasoline mode throughout a predetermined time interval after a start, whereupon the system switches automatically to the gas operation mode.

Naturally, while the principle of the invention remains the same, the details of construction and the embodiments may widely vary with respect to what has been described and shown purely by way of example, without departing from the scope of the present invention.

For instance, the electronic unit 4 can be constituted by single unit which attends to controlling the system both in the gasoline mode and in the gas mode as well as to controlling switching between one mode and the other. Alternatively, two separated units may be provided respectively for controlling the gasoline feeding subsystem and the gas feeding subsystem.

Furthermore, it is possible to provide for the system excluding the restart in the gasoline mode after the gas reservoir has been filled if the engine has been operated in the gasoline mode throughout a very long period of time for the reason that the gas level in the reservoir was below the minimum level at which switching to the gasoline mode is automatically controlled, as shown in FIG. 4.

What is claimed is:

1. Fuel feeding system for internal combustion engine adapted to be operated selectively with gasoline or a gas comprising:

gasoline feeding means, including a plurality of injectors associated with cylinders of the engine, and electronic control means controlling the gasoline injectors, adapted to receiving signals indicative of various parameters of operation of the engine as well as to controlling the gasoline injectors accordingly, and gas feeding means, including:

a plurality of gas injectors associated with the engine cylinders, a gas feeding manifold or rail for feeding said injectors, a gas reservoir, conduit means for feeding gas from the reservoir to said rail, sensor means for sensing the gas level in the reservoir, said electronic control means being adapted to control switching between a gasoline operation mode and a gas operation mode and being further adapted to controlling the gas injectors in the gas operation mode, said electronic control means being further adapted to compel the engine to restart in the gasoline mode after a stop, wherein said electronic control means are adapted to compelling the engine to restart in the gasoline mode after a stop only if said sensor means detect a raise of the gas level in reservoir during the stop by a value greater than a predetermined threshold value.

2. Fuel feeding system according to claim 1, wherein said electronic control means are also adapted to automatically switch the system from the gas operation mode to the gasoline operation mode if said sensor means detect that the gas level in the reservoir is lower than a minimum admissible value.

3. Method for controlling fuel feeding in an internal combustion engine adapted to selectively operate with gasoline and gas wherein gasoline feeding means are provided, including a plurality of injectors associated with the engine cylinders, and gas feeding means are provided, including:

a plurality of gas injectors associated with the cylinders of the engine, a gas feeding manifold or rail for feeding gas to the injectors, a gas reservoir, conduit means for feeding gas from the reservoir to said rail, and sensor means for sensing the gas level in the reservoir, wherein the engine is compelled to restart in a gasoline mode after a stop, comprising the step of automatically activating the gasoline operation mode when the engine is started after a stop only if said sensor means have detected that during the stop the gas level in the reservoir has raised of a value greater than a predetermined threshold value.

4. Method for controlling fuel feeding in an internal combustion engine according to claim 3, further comprising the step of switching the system from a gas operation mode to the gasoline operation mode to the gasoline operation mode if said sensor means detect that the gas level in the reservoir lowers below a minimum admissible value.

\* \* \* \* \*